United States Patent
Tsujii et al.

(10) Patent No.: US 12,155,209 B2
(45) Date of Patent: Nov. 26, 2024

(54) ADJUSTMENT POWER PROCUREMENT DEVICE AND ADJUSTMENT POWER PROCURING METHOD

(71) Applicant: Hitachi, Ltd., Tokyo (JP)

(72) Inventors: Yuki Tsujii, Tokyo (JP); Shota Omi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 394 days.

(21) Appl. No.: 17/622,916

(22) PCT Filed: Apr. 14, 2020

(86) PCT No.: PCT/JP2020/016440
§ 371 (c)(1),
(2) Date: Dec. 27, 2021

(87) PCT Pub. No.: WO2021/024554
PCT Pub. Date: Feb. 11, 2021

(65) Prior Publication Data
US 2022/0263312 A1    Aug. 18, 2022

(30) Foreign Application Priority Data
Aug. 2, 2019 (JP) .................................. 2019-142830

(51) Int. Cl.
*H02J 3/00* (2006.01)
*G05B 19/042* (2006.01)

(52) U.S. Cl.
CPC ............ *H02J 3/003* (2020.01); *G05B 19/042* (2013.01); *H02J 3/004* (2020.01); *G05B 2219/2639* (2013.01); *H02J 2203/20* (2020.01)

(58) Field of Classification Search
CPC ........ H02J 3/003; H02J 3/004; H02J 2203/20; H02J 2300/20; H02J 3/008; G05B 2219/2639; G06Q 30/0202
See application file for complete search history.

(56) References Cited

U.S. PATENT DOCUMENTS 11,342,750 B2 *   5/2022   Miyake ................... H02J 3/241
2012/0139241 A1 * 6/2012   Haj-Maharsi ........... F03D 9/257
                                                             290/44
(Continued)

FOREIGN PATENT DOCUMENTS

JP    2011-130584 A    6/2011
JP    2016-046884 A    4/2016
(Continued)

OTHER PUBLICATIONS

Extended European Search Report received in corresponding European Application No. 20849129.0 dated Aug. 1, 2023.
(Continued)

*Primary Examiner* — Zhipeng Wang
(74) *Attorney, Agent, or Firm* — MATTINGLY & MALUR, PC

(57) ABSTRACT

A regulated power procurement segment determination unit refers to a renewable energy theoretical maximum value database and a renewable energy output database and determines segments for procurement of regulated power, a demand/supply control simulation unit refers to the renewable energy output database, a demand database, and a power generator database, performs demand/supply control simulation by using the segments for procurement of regulated power, renewable energy output data, demand data, and power generator data, and predicts, on the basis of the demand/supply control simulation results, frequency changes and procurement costs regarding the segments for procurement of regulation power, and a segment selection unit refers to a cost database and a frequency change database and selects a segment for procurement of regulation power on the basis of the frequency changes and the procurement costs regarding the segments on which prediction has been performed.

9 Claims, 8 Drawing Sheets

(56) References Cited

U.S. PATENT DOCUMENTS

| | | | |
|---|---|---|---|
| 2016/0125339 A1* | 5/2016 | Itaya | H02J 3/004 705/7.25 |
| 2016/0190808 A1* | 6/2016 | Lee | H02J 3/381 307/24 |
| 2017/0310115 A1 | 10/2017 | Miyake et al. | |
| 2018/0025423 A1 | 1/2018 | Utsumi et al. | |
| 2018/0054058 A1 | 2/2018 | Kumagai et al. | |
| 2019/0036340 A1* | 1/2019 | Meeker | H02J 3/007 |

FOREIGN PATENT DOCUMENTS

| | | |
|---|---|---|
| JP | 2019-041457 A | 3/2019 |
| WO | 2014/155062 A1 | 10/2014 |
| WO | 2016/143021 A1 | 9/2016 |
| WO | 2018/154842 A1 | 8/2018 |

OTHER PUBLICATIONS

International Search Report of PCT/JP2020/016440 dated Jun. 30, 2020.

* cited by examiner

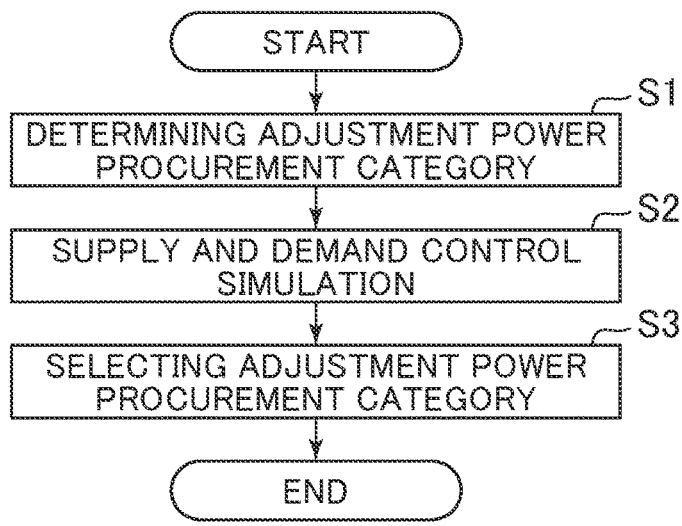

| SPECIFIED RELIABLE SECTION VALUE CATEGORY |
|---|
| $\sigma$ |
| $2\sigma$ |
| $3\sigma$ |
| . . . |

FIG. 8

| PATTEN A | | PATTEN B | |
|---|---|---|---|
| ADJUSTMENT POWER CATEGORY | DIVISION | ADJUSTMENT POWER CATEGORY | DIVISION |
| PRIMARY ADJUSTMENT POWER | PA1 | PRIMARY ADJUSTMENT POWER | PB1 |
| SECONDARY ADJUSTMENT POWER (1) | PA2 | SECONDARY ADJUSTMENT POWER (1) | PB2 |
| SECONDARY ADJUSTMENT POWER (2) | PA3 | SECONDARY ADJUSTMENT POWER (2) | PB3 |
| TERTIARY ADJUSTMENT POWER (1) | PA4 | TERTIARY ADJUSTMENT POWER (1) | PB4 |
| TERTIARY ADJUSTMENT POWER (2) | PA5 | TERTIARY ADJUSTMENT POWER (2) | PB5 |
| PRIMARY ADJUSTMENT POWER + SECONDARY ADJUSTMENT POWER (1) | PA6 | PRIMARY ADJUSTMENT POWER + SECONDARY ADJUSTMENT POWER (1) | PB6 |
| PRIMARY ADJUSTMENT POWER + SECONDARY ADJUSTMENT POWER (1) + SECONDARY ADJUSTMENT POWER (2) | PA7 | PRIMARY ADJUSTMENT POWER + SECONDARY ADJUSTMENT POWER (1) + SECONDARY ADJUSTMENT POWER (2) | PB7 |
| . . . | . . | . . . | . . |

FIG. 9

| TIME ZONE CATEGORY | OUTPUT ZONE CATEGORY | SPECIFIED RELIABLE SECTION VALUE CATEGORY | ADJUSTMENT POWER DIVISION CATEGORY | COST | FREQUENCY FLUCTUATION |
|---|---|---|---|---|---|
| EVERY ONE HOUR | EVERY 10% | 3σ | PATTERN A | T1 | F1 |
| EVERY ONE HOUR | EVERY 30% | 2σ | PATTERN B | T2 | F2 |
| EVERY ONE HOUR | EVERY 50% | 3σ | PATTERN B | T3 | F3 |
| EVERY THREE HOURS | EVERY 10% | σ | PATTERN A | T4 | F4 |
| EVERY THREE HOURS | EVERY 30% | 3σ | PATTERN B | T5 | F5 |
| EVERY THREE HOURS | EVERY 50% | 2σ | PATTERN B | T6 | F6 |
| EVERY SIX HOURS | EVERY 10% | 3σ | PATTERN A | T7 | F7 |
| ⋅ | ⋅ | ⋅ | ⋅ | ⋅ | ⋅ |

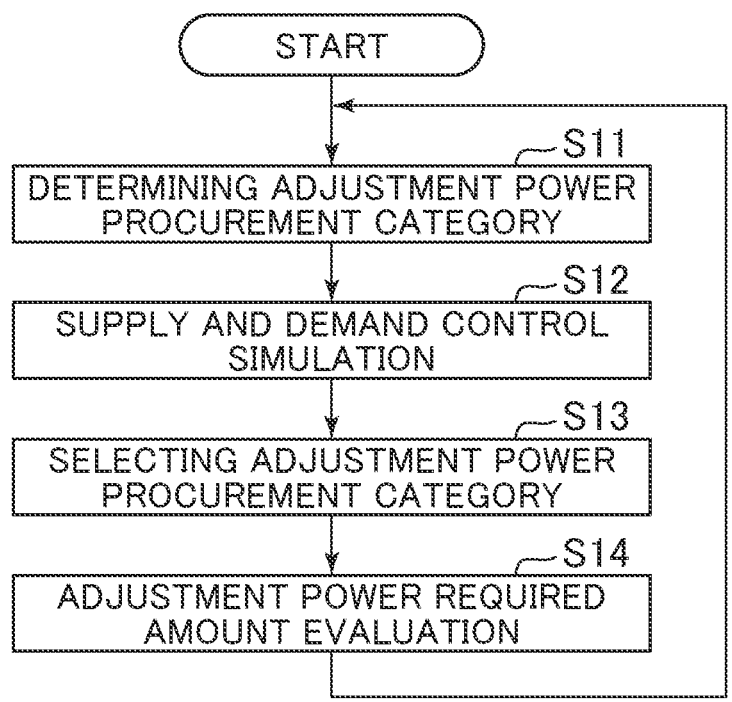

ADJUSTMENT POWER PROCUREMENT DEVICE AND ADJUSTMENT POWER PROCURING METHOD

TECHNICAL FIELD

The invention relates to an adjustment power procurement device and an adjustment power procuring method of a power system.

BACKGROUND ART

In order to provide a stable supply of electric power, it is necessary to adjust a balance between supply and demand and keep frequency within a control target value. The general electricity transmission and distribution companies maintain each frequency within the control target value for each unit of area, by combining the output adjustments by the generators of governor-free (hereinafter, referred to as GF), load frequency control (hereinafter, referred to as LFC), and economic load dispatching control (hereinafter, referred to as EDC), according to the fluctuation cycle of the supply and demand.

With a progress in the introduction of renewable energy (hereinafter, referred to as renewable energy), importance of adjusting a balance between supply and demand is increasing. At the present, the general electricity transmission and distribution companies procure the adjustment powers by public offering for the purpose of adjusting the supply and demand balance. When a supply and demand adjustment market for trading the adjustment powers is created, the general electricity transmission and distribution companies are to procure the adjustment powers in this supply and demand adjustment market.

In the supply and demand adjustment market, in order to cope with demand prediction errors, fluctuations in time, power supply dropouts, and the like, each general electricity transmission and distribution company secures the adjustment power that can be utilized for GF, LFC, and EDC. The adjustment power handled in the supply and demand adjustment market is categorized into primary adjustment power, secondary adjustment power (1), secondary adjustment power (2), tertiary adjustment power (1) and tertiary adjustment power (2), in the order of a faster output change (response time) up to the command value and a shorter output duration. In the GF corresponding to the primary adjustment power, a regulator (governor) is used to increase and decrease the output in response to a change of the system frequency. In the LFC corresponding to the secondary adjustment power (1), the frequency fluctuation and the current fluctuation of interconnection caused by the load fluctuation are detected, to adjust the output of the generator. In the EDC corresponding to the secondary adjustment power (2) and the tertiary adjustment power (1), the output is distributed to the generator so as to achieve the maximum economy. Here, the tertiary adjustment power (2) is regarded as the adjustment power of the low-speed category.

In addition to a supply ability, such abilities as "reaction power such as output change speed in response to a command from the central power supply control center" and "adjustment range to cope with the generated supply and demand difference" are required of these adjustment powers. In the supply and demand adjustment, the general electricity transmission and distribution companies procure each adjustment power ($\Delta kW$) having the "reaction power" and the "adjustment range" in advance and then put the adjustment powers in the practical use. According to the use of the adjustment power, variable costs (kWh) are generated. As mentioned above, in the supply and demand adjustment market, there exist "procurement of adjustment power (aspect of $\Delta kW$ acquisition)" and "use of the procured adjustment power (aspect of payment of the kWh value as for the practically used adjustment power)". Having the "$\Delta kW$" means that a generator and the like having the adjustment ability necessary for every time zone at a point of actual supply and demand is previously secured in a possible state of output adjustment.

The process of registration of adjustment unit price, bidding, contract processing and settlement after the processing will be described. In the registration of the adjustment unit price, an adjustment power provider enters the information about an upward adjustment unit price (V1) and a downward adjustment unit price (V2) at a time of activating the adjustment power collectively for a week for every adjustment power source, into a supply and demand adjustment market system. In the bid, the provider participating in the supply and demand adjustment market (procurement) inputs a selling $\Delta kW$ price of the adjustment power to be bid and the bid amount into the supply and demand adjustment market system. The general electricity transmission and distribution company that performs the procurement inputs the necessary adjustment power as a buying bid. In the contract processing, the buying bid amount desired by the general electricity transmission and distribution company may be awarded a contract from the bids of the power generation and electricity retail companies in the ascending order of the $\Delta kW$ price. In the settlement processing after the above processing, the results of the contract processing (contract price, contract fixed amount, contract power source, and the like) in the supply and demand adjustment market system are transmitted to the power generation and electricity retail company and the relevant general electricity transmission and distribution company. The payment of $\Delta kW$ in the supply and demand adjustment market (procurement) is performed based on the above information.

As mentioned above, in the supply and demand adjustment market, the general electricity transmission and distribution company procures the adjustment powers collectively for one week at a time. Here, it is necessary to secure the adjustment powers capable of reducing the procurement cost as much as possible while keeping the frequency fluctuation within the control target value. For the following reasons, however, it is difficult to determine how much adjustment power to be procured in each time zone.

At first, the output fluctuation of the renewable energy varies depending on the time zone and the output zone (weather). Secondly, when creating a table of required amount based on the actual results in the past, it is not clear which specific reliable section value (demand prediction error, the value of $\delta$, $2\delta$, $3\delta$ of the fluctuations in time, and the like) should be used. Thirdly, it is difficult to determine which section of each adjustment power (the primary adjustment power, the secondary adjustment power (1), the secondary adjustment power (2), the tertiary adjustment power (1) and the tertiary adjustment power (2)) handled in the supply and demand adjustment market should be used for calculating the required amount.

As a power generation plan creating method and a power generation plan creating system, there is a technique disclosed in Patent Literature 1. The Patent Literature 1 describes that in the power generation plan creating system, the generated power by the power generation facilities using the renewable energy is predicted by obtaining a weather forecast in an arbitrarily-settable time range and that with the load power in the system predicted, a power generation plan for absorbing the prediction error in the internal power generation facilities is created. It describes a method of creating a power generation plan with a cost priority when creating the power generation plan.

CITATION LIST

Patent Literature

[Patent Literature 1] Japanese Patent Laid-Open No. 2011-130584

SUMMARY OF INVENTION

Technical Problem

The Patent Literature 1, however, has no description with the adjustment power market taken into consideration and further does not describe which time zone, which output zone, which specified reliable section, and which adjustment power to be divided for use, to secure the adjustment power. Therefore, according to the method disclosed in the Patent Literature 1, it may be impossible to reduce the procurement cost of the adjustment power while keeping the frequency within the control target value.

Considering the above situations, the invention aims to provide an adjustment power procurement device and an adjustment power procurement method capable of reducing the procurement cost of the adjustment power while keeping the frequency of the power system within the control target value.

Solution of Problem

In order to achieve the above object, an adjustment power procurement device according to a first point of view includes: an adjustment power procurement category determination unit that determines the categories for procuring the adjustment power, based on the renewable energy output data; a supply and demand control simulation unit that predicts procurement costs and frequency fluctuations as for the categories for procuring the adjustment power, based on a supply and demand control simulation using the categories for procuring the adjustment power, the renewable energy output data, the demand data, and the generator data; and a category selection unit that selects the category for procuring the adjustment power, based on the predicted procurement costs and frequency fluctuations as for the categories for procuring the adjustment power.

Advantageous Effects of Invention

According to the invention, it is possible to reduce the procurement cost of the adjustment power while keeping the frequency of the power system within the control target value.

BRIEF DESCRIPTION OF DRAWINGS

FIG. 3 is a flow chart showing the processing by the adjustment power procurement device of FIG. 2.

FIG. 4 is a view showing one example of time zone categories determined by an adjustment power procurement category determination unit of FIG. 2.

FIG. 5 is a view showing one example of output zone categories determined by the adjustment power procurement category determination unit of FIG. 2.

FIG. 8 is a view showing one example of adjustment power division categories determined by the adjustment power procurement category determination unit of FIG. 2.

FIG. 9 is a view showing an example of category extracted by the adjustment power procurement category determination unit of FIG. 2.

FIG. 11 is a flow chart showing the processing by the adjustment power procurement device of FIG. 10.

DESCRIPTION OF EMBODIMENTS

Embodiments will be described with reference to the drawings. The embodiments described below are not to restrict the invention according to the claims and further all of the elements and combinations thereof described in the embodiments are not necessarily required for the solution means of the invention.

Figure 1:
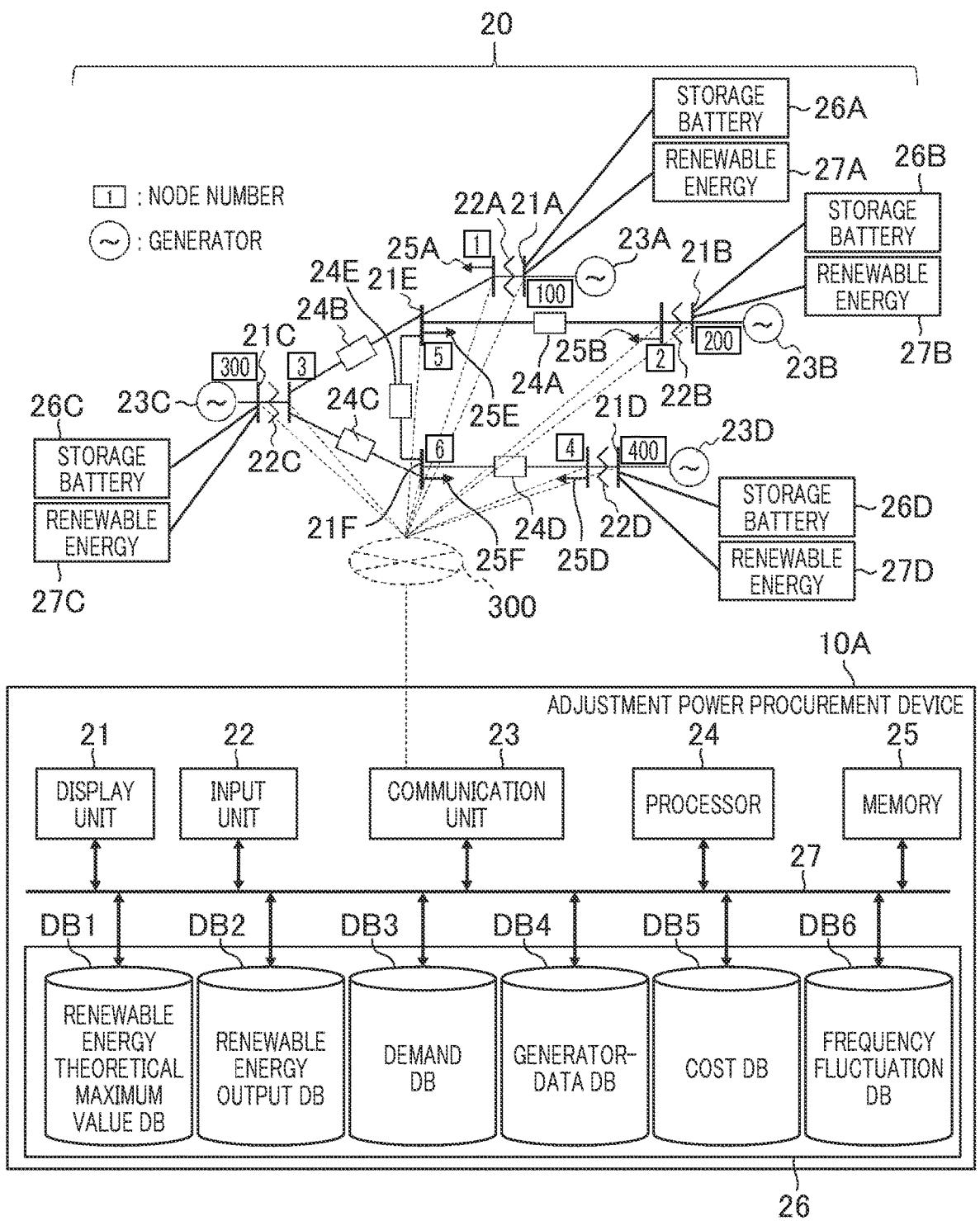
FIG. 1 is a block diagram showing a structure of an adjustment power procurement device according to a first embodiment.

FIG. 1 is a block diagram showing a structure of an adjustment power procurement device according to a first embodiment.

In FIG. 1, an adjustment power procurement device 10A of a power system 20 is formed by, for example, a calculation system. The adjustment power procurement device 10A of the power system 20 performs adjustment power procurement so that it may operate to suppress the frequency fluctuation caused by a load fluctuation of the power system 20. In this description, a distribution destination of output distribution is referred to as adjustment power. The adjustment power can be selected from at least one of a generator, a storage battery, and a demand response.

The adjustment power procurement device 10A of the power system 20 includes a display unit 21, an input unit 22, a communication unit 23, a processor 24, a memory 25, and a storage device 26. The display unit 21, the input unit 22, the communication unit 23, the processor 24, the memory 25, and the storage device 26 are mutually connected through bus 27.

Further, the adjustment power procurement device 10A of the power system 20 can gain access to the measurement information of the power system 20 through a communication network 300. The power system 20 is a system having a plurality of generators 23A to 23D and loads 25A, 25B, 25D to 25F mutually interconnected through bus lines (nodes) 21A to 21F, transformers 22A to 22D, and transmission lines (branches) 24A to 24E. Here, the generators 23A to 23D are, for example, a thermal power generator, a hydroelectric power generator, or a nuclear power generator. Various types of measurement devices are arranged in the nodes 21A to 21F to protect, control, and monitor the power system 20. Further, storage batteries 26A to 26D and renewable energy generators 27A to 27D are respectively connected to the nodes 21A to 21D. The renewable energy generators 27A to 27D are, for example, a photovoltaic generator, a solar heat power generator, or a wind power generator.

The display unit 21 displays the parameters handled in the adjustment power procurement device 10A of the power system 20 and the processing results of the adjustment power procurement device 10A of the power system 20. The display unit 21 may be a display device or a display device together with a printer or an audio output device.

The input unit 22 enters various conditions for operating the adjustment power procurement device 10A of the power system 20. The input unit 22 may be provided with at least one of a touch panel and a voice instruction device in addition to a keyboard and a mouse.

The communication unit 23 includes a circuit and a communication protocol for connecting to the communication network 300. The communication network 300 may be a WAN (Wide Area Network) such as the Internet or a LAN (Local Area Network) such as WiFi or Ethernet (registered trademark), or a mixture of WAN and LAN.

The processor 24 executes a computer program, searches for data in various databases stored in the storage device 26, makes an instruction to display the processing results, and performs the processing about the adjustment power procurement of the power system 20. The processor 24 may be a CPU (Central Processing Unit) or a GPU (Graphics Processing Unit). The processor 24 may be a single core processor or a multi-core processor. The processor 24 may be provided with a hardware circuit (for example, FPGA (Field-Programmable Gate Array) or ASIC (Application Specific Integrated Circuit)) for performing a part or the whole of the processing. The processor 24 may be provided with a neutral network. The processor 24 may be formed as one or a plurality of semiconductor chips or may be formed as a computer device such as a calculating server.

The memory 25 is formed as, for example, RAM (Random Access Memory), to store the computer program and the calculation result data and to provide a work area necessary for each processing to the processor 24.

The storage device 26 is a storing device having a large amount of storage capacity, for example, a hard disk device or SSD (Solid State Drive). The storage device 26 can hold execution files of various programs and data used for executing the programs. The storage device 26 can hold a renewable energy theoretical maximum value database DB1, a renewable energy output database DB2, a demand database DB3, a generator database DB4, a cost database DB5, and a frequency fluctuation database DB6. Further, the storage device 26 can hold the adjustment power procurement program of the power system 20. The adjustment power procurement program of the power system 20 may be software that can be installed in the adjustment power procurement device 10A of the power system, or may be built as firmware in the adjustment power procurement device 10A of the power system.

The renewable energy theoretical maximum value database DB1 stores theoretical maximum values of renewable energy. The theoretical maximum value of the renewable energy is the maximum value of the renewable energy that can be output at each time (in the case of the photovoltaic power generation, the output in a fine weather).

The renewable energy output database DB2 stores renewable energy output data. The renewable energy output data can show the actual value of the renewable energy output. The actual value of the renewable energy output is a renewable energy output, for example, per each time for one day in the past. The renewable energy output for one day in the past can adopt, for example, the statistical value of the renewable energy outputs for years in the past.

The demand database DB3 stores demand data. The demand data can show the actual value of the electric power demand. The actual value of the electric power demand is, for example, an electric power demand per each time for one day in the past. The electric power demand for one day in the past can adopt, for example, the statistical value of the electric power demands for years in the past.

The generator database DB4 stores generator data. The generator data is capacity, output variable speed, power generation unit price, and the like of a generator.

The cost database DB5 stores cost data. The cost is a procurement cost of $\Delta kW$ and an operation cost of kWh.

The frequency fluctuation database DB6 stores frequency fluctuation data. The frequency fluctuation data can show the frequency fluctuation of the power system 20 at the operation time of the adjustment power.

The execution of the adjustment power procurement program of the power system 20 may be shared by a plurality of processors and a computer. Alternatively, the processor 24 may instruct a cloud computer through the communication network 300 to execute the whole or a part of the adjustment power procurement program of the power system 20, to receive the execution results.

Although FIG. 1 shows the example in which the adjustment power procurement device 10A of the power system 20 includes the renewable energy theoretical maximum value database DB1, the renewable energy output database DB2, the demand database DB3, the generator database DB4, the cost database DB5, and the frequency fluctuation database DB6, it may be designed to hold at least one of the renewable energy theoretical maximum value database DB1, the renewable energy output database DB2, the demand database DB3, the generator database DB4, the cost database DB5, and the frequency fluctuation database DB6 in a cloud server.

The processor 24 determines categories for procuring the adjustment power, based on the renewable energy output data by executing an adjustment power procurement program of the power system 20, predicts the procurement costs and the frequency fluctuations as for the categories for procuring the adjustment power, based on a supply and demand control simulation using the categories for procuring the adjustment power, the renewable energy output data, the demand data, and the generator data, and selects the category for procuring the adjustment power, based on the predicted procurement costs and frequency fluctuations as for the categories for procuring the adjustment power.

At this time, the processor 24 can select a category having the lowest procurement cost of the adjustment power, of the categories having the frequency fluctuations of the power system 20 within the control target value. According to this, it is possible to reduce the procurement cost of the adjustment power while keeping the frequency of the power system 20 within the control target value.

Here, the category for procuring the adjustment power may include a time zone category, an output zone category, a specified reliable section value category, and an adjustment power division category. According to this, it is possible to determine how much adjustment power to be procured in each time zone with how much degree of reliability, in order to reduce the procurement cost as much as possible while keeping the frequency fluctuation within the control target value depending on the fluctuation cycle of the supply and demand.

Figure 2:
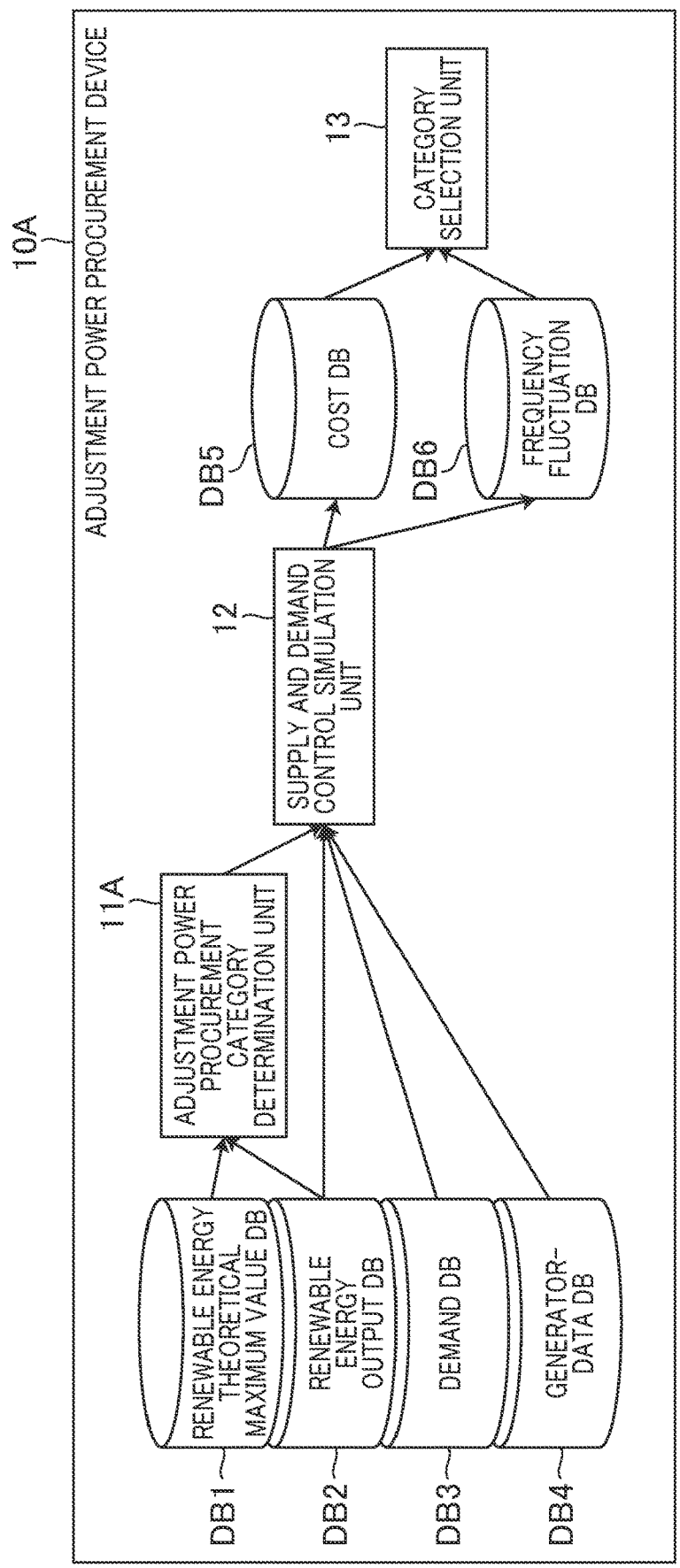
FIG. 2 is a block diagram showing a functional structure of the adjustment power procurement device according to the first embodiment.

FIG. 2 is a block diagram showing a functional structure of the adjustment power procurement device according to the first embodiment.

In FIG. 2, the adjustment power procurement device 10A of the power system 20 includes the renewable energy theoretical maximum value database DB1, the renewable energy output database DB2, the demand database DB3, the generator database DB4, the cost database DB5, and the frequency fluctuation database DB6.

Further, the adjustment power procurement device 10A of the power system 20 includes an adjustment power procurement category determination unit 11A, a supply and demand control simulation unit 12, and a category selection unit 13.

The adjustment power procurement category determination unit 11A determines the categories for precuring the adjustment power, based on the renewable energy output data. The category for procuring the adjustment power includes at least one of the time zone category, the output zone category, the specified reliable section value category, and the adjustment power division category. The time zone category is a category of the time zone for procuring the adjustment power. The output zone category is a category of output zone for procuring the adjustment power. The output zone can be represented by, for example, the ratio of the renewable energy output to the theoretical maximum output of the renewable energy. The output zone can show the fluctuation amount of the renewable energy output. The specified reliable section value category is a category showing how much degree of reliability can be secured to obtain the adjustment power with respect to the output fluctuation of the renewable energy, the demand prediction error, and the like. The adjustment power division category is a category showing how to divide the adjustment powers respectively (the primary adjustment power, the secondary adjustment power (1), the secondary adjustment power (2), the tertiary adjustment power (1), and the tertiary adjustment power (2)) handled in the supply and demand adjustment market.

The adjustment power procurement category determination unit 11A can determine each of the time zone category, the output zone category, the specified reliable section value category, and the adjustment power division category manually, randomly, linearly, or using the actual values in the past.

The supply and demand control simulation unit 12 predicts the procurement costs and the frequency fluctuations as for the categories for procuring the adjustment power, based on the supply and demand control simulation using the categories for procuring the adjustment power, the renewable energy output data, the demand data, and the generator data.

The category selection unit 13 selects the category for procuring the adjustment power, based on the predicted procurement costs and frequency fluctuations as for the categories for procuring the adjustment power. At this time, the category selection unit 13 can select a category having the lowest procurement cost from the categories having the frequency fluctuation within the control target value.

FIG. 3 is a flow chart showing the processing by the adjustment power procurement device of FIG. 2.

In FIG. 3, in Step S1, the adjustment power procurement category determination unit 11A of FIG. 2 determines the categories for procuring the adjustment power, with reference to the renewable energy theoretical maximum value database DB1 and the renewable energy output database DB2.

Next, in Step S2, the supply and demand control simulation unit 12 performs the supply and demand control simulation using the categories for procuring the adjustment power, the renewable energy output data, the demand data, and the generator data, with reference to the renewable energy output database DB2, the demand database DB3, and the generator database DB4. Then, the supply and demand control simulation unit 12 predicts the procurement costs and the frequency fluctuations as for the categories for procuring the adjustment power, based on the results of the supply and demand control simulation.

Next, in Step S3, the category selection unit 13 selects the category for procuring the adjustment power, based on the predicted procurement costs and frequency fluctuations by the supply and demand control simulation unit 12 as for the respective categories, with reference to the cost database DB5 and the frequency fluctuation database DB6.

In the supply and demand adjustment market, the general electricity transmission and distribution company can select the adjustment power collectively for one week, based on the category selected by the category selection unit 13. According to this, even when the output fluctuation of the renewable energy varies depending on the time zone and the output zone (weather), it is possible to secure the adjustment power capable of reducing the procurement cost as much as possible while keeping the frequency fluctuation within the control target value.

FIG. 4 is a view showing one example of the time zone categories determined by the adjustment power procurement category determination unit of FIG. 2.

In FIG. 4, in the time zone category, the time zone for procuring the adjustment power can be set as, for example every one hour, every three hours, and every six hours, and the like. For example, when the time zone for procuring the adjustment power is every one hour, a necessary adjustment power is calculated in every time zone of 0:00 to 1:00, 1:00 to 2:00, . . . , 23:00 to 24:00.

When determining the time zone category, it may be determined manually, randomly, linearly, or it may be determined preferentially from the categories capable of reducing the cost while keeping the frequency within the control target value, by using the actual results in the past. Here, the above phrase "linearly" means that the divided time zones are in a proportional relationship, such as every one hour, every two hours, every three hours, and the like.

FIG. 5 is a view showing one example of the output zone categories determined by the adjustment power procurement category determination unit of FIG. 2.

In FIG. 5, in the output zone category, for example, the output zone for procuring the adjustment power can be set as every 10%, 30%, and every 50%, and the like. For example, when the output zone for procuring the adjustment power is every 10%, a necessary adjustment power is calculated in every output zone of 0% to 10%, 10% to 20%, . . . , 90% to 100%. At this time, when the output zone category is every 10%, the output fluctuation can be reduced and the necessary adjustment power can be reduced. When the output zone category is every 50%, the output fluctuation becomes larger and the necessary adjustment power is increased.

When determining the output zone category, it may be determined manually, randomly, linearly, or it may be determined preferentially from the categories capable of reducing the cost while keeping the frequency within the control target value using the actual results in the past.

Figures 6, 7:
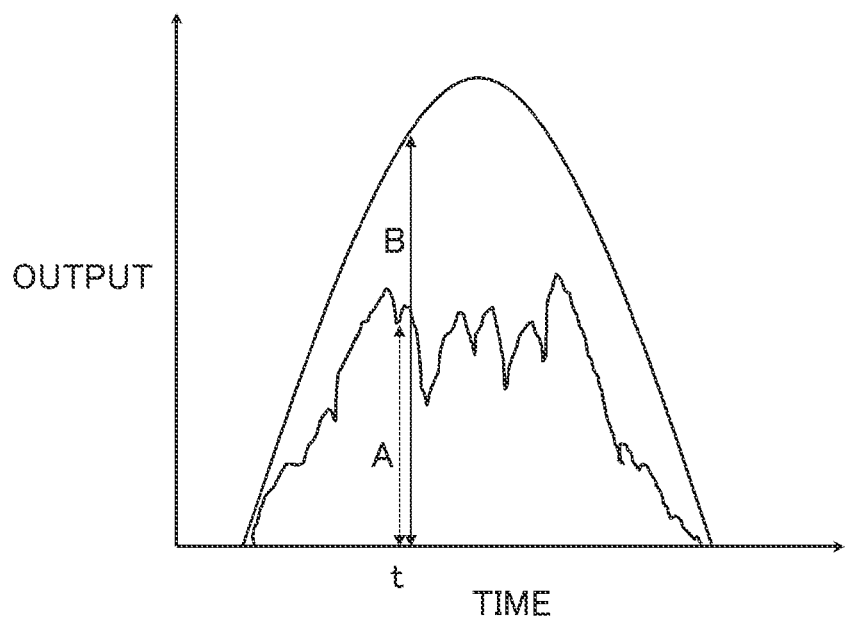
FIG. 6 is a view showing one example of a relation between output and theoretical maximum output used for the output zone category in FIG. 5.
FIG. 7 is a view showing one example of specified reliable section value categories determined by the adjustment power procurement category determination unit of FIG. 2.

FIG. 6 is a view showing one example of a relation between the output and the theoretical maximum output used for the output zone category in FIG. 5.

In FIG. 6, assuming that the theoretical maximum output for one day in the case of photovoltaic power generation is defined as B and the output thereof is defined as A, the output zone in FIG. 5 can be given by A/B. For the output A, the statistical value of the photovoltaic power generation outputs in the past can be used.

FIG. 7 is a view showing one example of the specified reliable section value categories determined by the adjustment power procurement category determination unit of FIG. 2.

In FIG. 7, in the specified reliable section value category, a specified reliable section value for procuring the adjustment power can be set at, for example, $\delta$, $2\delta$, $3\delta$, and the like. For example, when the specified reliable section value for procuring the adjustment power is $\delta$, the value $\delta$ of the demand prediction error, the fluctuations in time, and the like is defined as the required amount of the adjustment power, in a certain time zone and output zone.

When determining the specified reliable section value category, it may be determined manually, randomly, linearly, or it may be determined preferentially from the categories capable of reducing the cost while keeping the frequency within the control target value using the actual results in the past.

FIG. 8 is a view showing one example of the adjustment power division categories determined by the adjustment power procurement category determination unit of FIG. 2.

In FIG. 8, in the adjustment power category, the adjustment power to be procured can be set as, for example, the primary adjustment power, the secondary adjustment power (1), the secondary adjustment power (2), the tertiary adjustment power (1), and the tertiary adjustment power (2). Although the required amount is generally set for every adjustment power category in a one-to-one relationship, a combined way for setting the required amount (the primary adjustment power+the secondary adjustment power (1), the primary adjustment power+the secondary adjustment power (1)+the secondary adjustment power (2)) may be prepared.

As the adjustment power category dividing way, the required amount how much amount to be procured in each adjustment power is calculated in every pattern. For example, in the case of the pattern A, the required amounts PA1 to PA7 (MW) for the divided adjustment powers are calculated and in the case of the pattern B, the required amounts PB1 to PB7 (MW) for the divided adjustment powers are calculated.

When determining the adjustment power division category, it may be determined manually, randomly, linearly, or it may be determined preferentially from the categories capable of reducing the cost while keeping the frequency within the control target value using the actual values in the past.

FIG. 9 is a view showing one example of the categories extracted by the adjustment power procurement category determination unit of FIG. 2.

FIG. 9 shows the categories determined in every time zone category, output zone category, specified reliable section value category, and adjustment power division category. In FIG. 9, there is shown an example of the categories in combination of the time zone categories of FIG. 4, the output zone categories of FIG. 5, the specified reliable section value categories of FIG. 7, and the patterns of the adjustment power division categories of FIG. 8. In each of these determined categories, the procurement costs T1 to T7, . . . and the frequency fluctuations F1 to F7, . . . are predicted by performing the supply and demand control simulation using the model of the power system 20 of FIG. 1.

As set forth hereinabove, according to the above-mentioned first embodiment, it is possible to procure the adjustment power in a category capable of reducing the cost while keeping the frequency within the control target value, from the infinitely-existing time zone categories, output zone categories, specified reliable section value categories, and adjustment power division categories.

Figure 10:
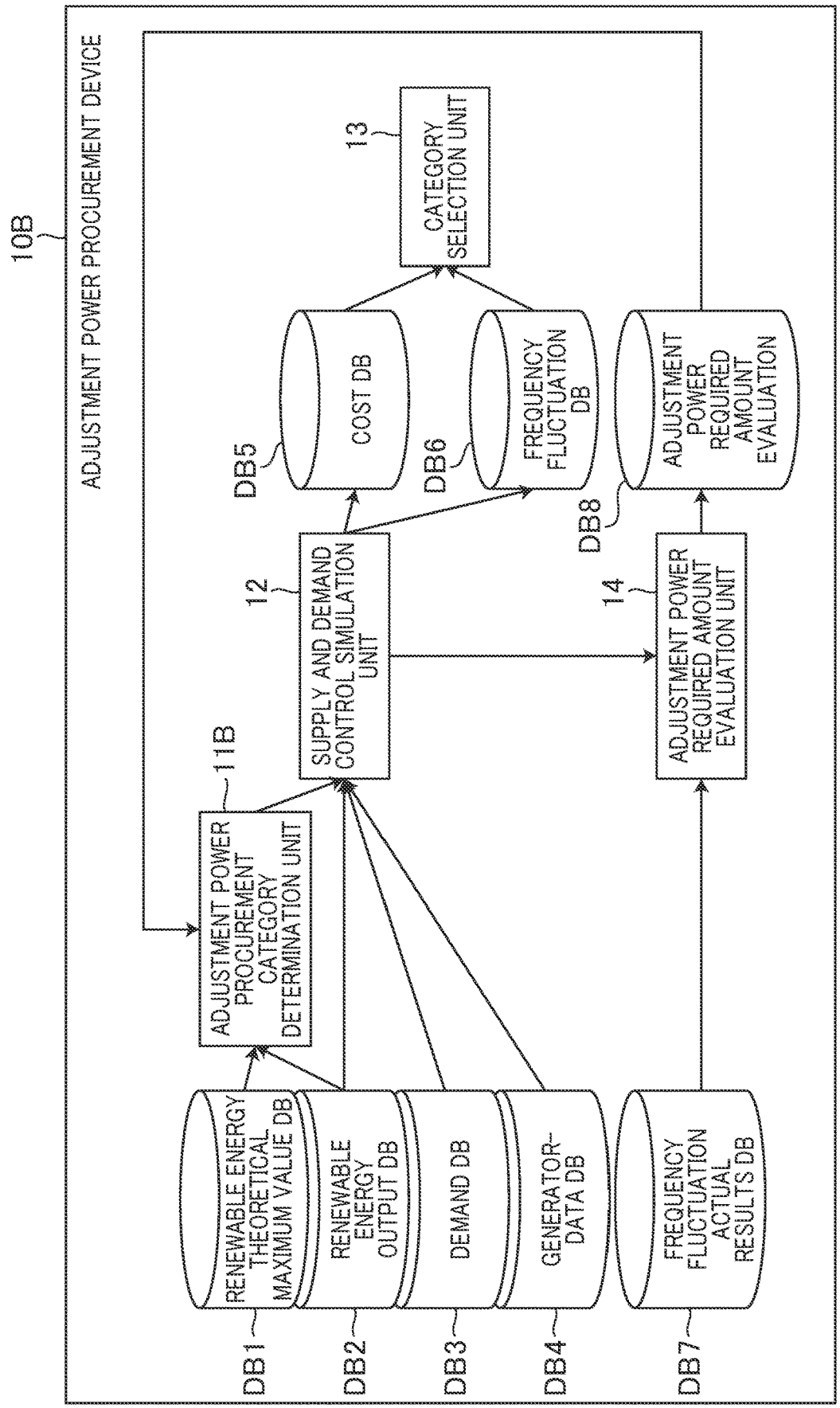
FIG. 10 is a block diagram showing a functional structure of the adjustment power procurement device according to a second embodiment.

FIG. 10 is a block diagram showing a functional structure of an adjustment power procurement device according to a second embodiment.

In FIG. 10, in addition to the structure of the adjustment power procurement device 10A of the power system 20 of FIG. 2, the adjustment power procurement device 10B of the power system 20 further includes an adjustment power required amount evaluation unit 14, a frequency fluctuation actual results database DB7, and an adjustment power required amount evaluation results database DB8. Further, the adjustment power procurement device 10B of the power system 20 includes an adjustment power procurement category determination unit 11B, instead of the adjustment power procurement category determination unit 11A of the adjustment power procurement device 10A of the power system 20 of FIG. 2.

The adjustment power required amount evaluation unit 14 evaluates the required amount of the adjustment power, based on the value of the actual results of the frequency fluctuation at the operation time of the adjustment power procured according to the category selected by the category selection unit 13 and the predicted value of the frequency fluctuation predicted by the supply and demand control simulation unit 12 as for the category for procuring the adjustment power.

The adjustment power procurement category determination unit 11B determines the category for procuring the adjustment power, based on the renewable energy output data and the adjustment power required amount evaluation results evaluated by the adjustment power required amount evaluation unit 14.

The frequency fluctuation actual results database DB7 stores the value of the actual results at the operation time of the adjustment power procured by the category selection unit 13. The adjustment power required amount evaluation results database DB8 stores the adjustment power required amount evaluation results evaluated by the adjustment power required amount evaluation unit 14.

FIG. 11 is a flow chart showing the processing of the adjustment power procurement device of FIG. 10.

In FIG. 11, in Step S11, the adjustment power procurement category determination unit 11B determines the categories for procuring the adjustment power, with reference to the renewable energy theoretical maximum value database DB1, the renewable energy output database DB2, and the adjustment power required amount evaluation results database DB8.

Next, in Step S12, the supply and demand control simulation unit 12 performs the supply and demand control simulation using the categories for procuring the adjustment power, the renewable energy output data, the demand data, and the generator data, with reference to the renewable energy output database DB2, the demand database DB3, and the generator database DB4. Then, the supply and demand control simulation unit 12 predicts the procurement costs and the frequency fluctuations as for the categories for procuring the adjustment power, based on the supply and demand control simulation results.

Then, in Step S13, the category selection unit 13 selects the category for procuring the adjustment power, based on the procurement costs and the frequency fluctuations as for the categories predicted by the supply and demand control simulation unit 12, with reference to the cost database DB5 and the frequency fluctuation database DB6.

Next, in Step S14, the adjustment power required amount evaluation unit 14 evaluates the simulation results and the actual result value of the frequency fluctuation, with reference to the frequency fluctuation actual results database DB7, to reflect the above in the next plan. For example, the adjustment power required amount evaluation unit 14 determines whether the frequency at the operation time of the current adjustment power is within the control target value; when the frequency is not within the control target value, the above unit performs, for example, the processing of increasing the specified reliable section value and the like on the adjustment power procurement category determination unit 11B, at a time of determining the categories used for the operation of the adjustment power in the next time and later.

At this time, the adjustment power procurement category determination unit 11B increases the specified reliable section value when determining the categories for procuring the adjustment power in the next time and later. For example, the adjustment power procurement category determination unit 11B changes 6 to 26 and changes 26 to 36 in the respective categories of FIG. 9. The supply and demand control simulation unit 12 predicts the procurement costs and the frequency fluctuations as for the respective categories thus changed, and the category selection unit 13 selects the category for procuring the adjustment power from the changed categories, based on the predicted procurement costs and frequency fluctuations.

As set forth hereinabove, according to the second embodiment, it is possible to procure the adjustment power in a category capable of reducing the cost while keeping the frequency within the control target value, from the infinitely-existing time zone categories, output zone categories, specified reliable section value categories, and adjustment power division categories, with the feeding back results by the ex-post evaluation reflected there.

Here, the invention is not restricted to the above-mentioned embodiments but it may include various modified examples. For example, the above-mentioned embodiments have been described in details for the sake of making the invention easily understood but the invention is not necessarily restricted to the above including all the components having been described. Further, a part of the components of one embodiment may be replaced with a component of another embodiment, and a component of one embodiment may be added to the components of another embodiment. Further, another component may be added to, deleted from, and replaced with a part of the components of the respective embodiments. Further, a part or the whole of the above-mentioned components, functions, processing units, and processing means may be realized by hardware, for example, by being designed as the integrated circuit.

LIST OF REFERENCE SIGNS

DB1: RENEWABLE ENERGY THEORETICAL MAXIMUM VALUE DATABASE
DB2: RENEWABLE ENERGY OUTPUT DATABASE
DB3: DEMAND DATABASE
DB4: GENERATOR DATABASE
DB5: COST DATABASE
DB6: FREQUENCY FLUCTUATION DATABASE
DB7: FREQUENCY FLUCTUATION ACTUAL RESULTS DATABASE
DB8: ADJUSTMENT POWER REQUIRED AMOUNT EVALUATION RESULT DATABASE
20: POWER SYSTEM
10A, 10B: ADJUSTMENT POWER PROCUREMENT DEVICE
11A, 11B: ADJUSTMENT POWER PROCUREMENT CATEGORY DETERMINATION UNIT
12: SUPPLY AND DEMAND CONTROL SIMULATION UNIT
13: CATEGORY SELECTION UNIT
14: ADJUSTMENT POWER REQUIRED AMOUNT EVALUATION UNIT
21: DISPLAY UNIT
22: INPUT UNIT
23: COMMUNICATION UNIT
24: PROCESSOR
25: MEMORY
26: STORAGE DEVICE
27: BUS
300: COMMUNICATION NETWORK

The invention claimed is:

1. An adjustment power procurement device comprising:
at least one processor, which when executing at least one program, configures the at least one processor to:
determine a plurality of categories for procuring adjustment power including at least one of a time zone category for procuring adjustment power, an output zone category, a specific reliable section value category, and an adjustment power division category, as a plurality of selection candidates, based on renewable energy output data;
predict procurement costs and frequency fluctuations for each of the plurality of selection candidates, based on a supply and demand control simulation using the categories for procuring the adjustment power, the renewable energy output data, demand data, and generator data; and
select any of the plurality of selection candidates, based on the predicted procurement costs and frequency fluctuations for the plurality of selection candidates.

2. The device according to claim 1, wherein the at least one processor is further configured to:
select the selection candidate having the lowest procurement cost, among the selection candidates having the frequency fluctuations within a control target value.

3. The device of a power system according to claim 1, wherein the at least one processor is further configured to:
determine setting contents of the time zone categories for procuring the adjustment power as for the plurality of selection candidates, manually, randomly, and linearly so that setting contents of the plurality of selection candidates are in proportional relationship, or by using actual result values in the past.

4. The device of the power system according to claim 1, wherein the at least one processor is further configured to:
determine setting contents of the output zone categories for procuring the adjustment power as for the plurality of selection candidates, manually, randomly, or linearly so that setting contents of the plurality of selection candidates are in proportional relationship, or by using the actual result values in the past.

5. The device of the power system according to claim 1, wherein the at least one processor is further configured to:
   determine setting contents of the specified reliable section value categories for procuring the adjustment power as for the plurality of selection candidates, manually, randomly, or linearly so that setting contents of the plurality of selection candidates are in proportional relationship, or by using the actual result values in the past.

6. The device of the power system according to claim 1, wherein the at least one processor is further configured to:
   determine setting contents of the adjustment power division categories for procuring the adjustment power as for the plurality of selection candidates, manually, randomly, or linearly so that setting contents of the plurality of selection candidates are in proportional relationship, or by using the actual result values in the past.

7. The device of the power system according to claim 1, the at least one processor is further configured to:
   evaluate a required amount of the adjustment power, based on the actual result values of the frequency fluctuations at an operation time of the adjustment power procured based on the selected category and the predicted values of the frequency fluctuations; and
   determine the categories for procuring the adjustment power, based on the renewable energy output data and the evaluation results of the required amounts of the adjustment power.

8. An adjustment power procuring method executed by at least one processor, wherein the at least one processor:

determines a plurality of categories for procuring the adjustment power including at least one of a time zone category for procuring adjustment power, an output zone category, a specific reliable section value category, and an adjustment power division category, as a plurality of selection candidates, based on renewable output data, predicts procurement costs and frequency fluctuations for each of the plurality of selection candidates, based on a supply and demand control simulation using the categories for procuring the adjustment power, the renewable energy output data, demand data, and generator data, and selects any of the plurality of selection candidates, based on the procurement costs and the frequency fluctuations predicted for the plurality of selection candidates.

9. The method according to claim 8, in which the at least one processor selects the selection candidate having the lowest procurement cost, among the selection candidates having the frequency fluctuations within a control target value.

* * * * *